(12) United States Patent
Colton, Sr.

(10) Patent No.: US 6,705,339 B2
(45) Date of Patent: Mar. 16, 2004

(54) SURGE CHECK UNIT FOR A LIQUID DISTRIBUTION SYSTEM

(75) Inventor: Grant A. Colton, Sr., Butler, PA (US)

(73) Assignee: GA Industries, Inc., Cranberry Township, PA (US)

( * ) Notice: Subject to any disclaimer, the term of this patent is extended or adjusted under 35 U.S.C. 154(b) by 102 days.

(21) Appl. No.: 10/156,591

(22) Filed: May 28, 2002

(65) Prior Publication Data

US 2003/0221723 A1 Dec. 4, 2003

(51) Int. Cl.[7] .............................................. G05D 16/04
(52) U.S. Cl. .............. 137/115.18; 137/115.19; 137/565.14; 137/565.15
(58) Field of Search ................ 137/115.18, 115.19, 137/565.13, 565.14, 565.15

(56) References Cited

U.S. PATENT DOCUMENTS

| | | | |
|---|---|---|---|
| 1,936,537 A | 11/1933 | Borden | 137/69 |
| 1,995,299 A * | 3/1935 | Foulds | 137/115.14 |
| 3,211,174 A | 10/1965 | Weise et al. | 137/469 |
| 3,583,432 A | 6/1971 | Powell et al. | 137/489 |
| 3,722,852 A | 3/1973 | Powell et al. | 251/61.2 |
| 4,398,557 A | 8/1983 | Dugge | 137/493.9 |
| 4,489,746 A * | 12/1984 | Daghe et al. | 137/218 |
| 4,535,807 A | 8/1985 | Ericson | 137/533.31 |
| 5,011,116 A | 4/1991 | Alberts et al. | 251/334 |
| 5,890,508 A | 4/1999 | Powell | 137/15 |

FOREIGN PATENT DOCUMENTS

GB     856211     12/1960

* cited by examiner

Primary Examiner—Gerald A. Michalsky
(74) Attorney, Agent, or Firm—Armstrong, Kratz, Quintos, Hanson & Brooks, LLP

(57) ABSTRACT

A safety check unit for use in a liquid distribution system for preventing damage to a pump and associated components of the system in event of loss in pumping pressure. The unit provides a check component to prevent back-flow of the liquid when the pump is shut down, and provides protection against a possible vacuum condition in the system by introducing air to the system; protects against damage by a surging back-flow of liquid by opening a relief port of the unit; and protects against air in the system by use of an air relief mechanism of the unit.

8 Claims, 12 Drawing Sheets

SURGE CHECK UNIT FOR A LIQUID DISTRIBUTION SYSTEM

FIELD OF THE INVENTION

This invention relates to a safety check unit for use in a liquid distribution system, having a pump for distribution of the liquid, to protect equipment of the system from damage associated with loss of pumping capability.

BACKGROUND OF THE INVENTION

In a liquid distribution system, such as a municipal water or sewage system, a pump is typically provided at least at one end of the distribution system so as to provide the pressure required for distributing the liquid throughout the system. An example of a system of concern is a municipal water system wherein water from a reservoir, for example, is pumped through a series of water mains for eventual distribution to homes, commercial establishments, industrial facilities, and the like. In such a system, it is prudent to protect the pump and associated equipment from damage which could occur if the pump, for whatever reason, suddenly loses head pressure and stops pumping. When such an event occurs, damage can be caused to the pump, distribution manifolds, piping and other equipment associated with the pump.

A number of conditions caused by the sudden loss of pumping pressure must be addressed within seconds of the pressure loss in order to prevent damage to the mentioned equipment. The conditions include: 1) the presence of a negative pressure (in relation to atmospheric pressure) within manifolds, pipelines, fittings, valve bodies, etc. near the pump which potentially can cause cracking or structural failure of those components; 2) a back-flowing of the liquid in the system, with an impact which potentially can cause severe structural damage to the pump, manifolds, pipeline, fittings, valve bodies etc. in the vicinity of the pump; and 3) if such conditions are not addressed properly, pockets of air which can form and which can cause problems upon start-up of the system following the loss of pumping pressure.

Prior art means to overcome the conditions which threaten the pump and related equipment have been cumbersome and complex, they involve many man hours for installation and they require a large amount of space in pumping station facilities. Use of a number of components, each to address a different condition described above, and installed in different locations, increases the possibility of component failure and leakage at joints connecting the piping and the components. Mismatching of size or capacity of the components does not provide the optimum protection. Extensive engineering analysis to match all of the components to each other and to the overall system is required. High labor cost and often compromised assembly of the components, under field conditions, can result in future occurrences of leaks and the like. Positioning of the various components at locations in the system, which may not be the critical location for operating in an optimum manner when loss of pressure or surge occurs, compromises the system.

The various devices, which previously have been provided for controlling the above-mentioned threats to the system include: 1) a check valve, which ideally is piped into the system immediately down stream of the system pump; 2) a surge relief valve, usually positioned at an end of a manifold of the system, but remote from the pump, for receiving and relieving the above-described back-flow surge resulting from the loss of pumping pressure, and 3) an air/vacuum valve, also usually provided at an end of a manifold, or other various locations in the system at a location remote from the pump, to allow air into the system when negative pressure within the system is detected, so as to prevent a vacuum condition, and to allow that air out of the system prior to or during normal operating conditions.

In the present disclosure of the apparatus of the invention, terms such as upstream, downstream, and the like, are used in relation to the flow of the liquid being pumped in a direction to supply the liquid under pressure from the liquid source, through the liquid distribution system to the residential, commercial, and industrial users.

OBJECTS OF THE INVENTION

It is an object of the present invention to provide a compact device which incorporates all of the functions necessary to protect a pump, and associated components of a liquid distribution system, from structural damage caused by a sudden drop in the pumping pressure of the pump.

It is another object of the present invention to dispose components of the device, and sensing means required for operation of each component, at an optimum location in the distribution system, and to have components configured for optimum effectiveness in overcoming detrimental conditions.

It is yet another object of the invention to provide a device having all of the features properly sized in relation to each other and integrated for optimum performance, and to provide a device which can be incorporated into a liquid distribution system at solely one critical point of insertion into the system.

It is still another object of the invention to provide a device requiring no electrical, hydraulic or other external support, and requiring no intervention of operating personnel for damage controlling operation of the device or for returning the device back to normal operating conditions following return of the pumping pressure.

SUMMARY OF THE INVENTION

The present invention is a safety check unit for use in a liquid distribution system which has a pump and a piping network downstream of the pump for distributing the pumped liquid, wherein the pump intakes a liquid at an intake pressure and outputs the liquid to the piping network at an output pressure which is greater than the intake pressure; and upon terminating pumping, the liquid in the pipe network exerts a back-pressure at the pump which is greater than the intake pressure. The unit is configured for placement in communication with the liquid distribution system downstream of the pump and includes: a liquid checking portion, for checking liquid when back-flowing from the piping network toward the pump, the liquid checking portion having an inlet port in communication with the pump, an outlet port in communication with the distribution system, an internal chamber intermediate the ports and a closing member disposed in the internal chamber for preventing back-flowing of the liquid; a surge relief portion, communicating directly with the internal chamber, for relieving liquid from the system and reducing liquid pressure in the system rapidly when the liquid pressure in the internal chamber is above a pre-selected pressure which is greater than an operating output pressure of the pump; an air input portion, communicating directly with the internal chamber, for providing air to the system when the internal chamber is at least partially void of liquid and a pressure in the void is below atmospheric pressure; and an air release portion, communicating directly with the internal chamber, for releasing air from the system at an adjustable speed when air is in the internal chamber at a pressure above atmospheric pressure.

DESCRIPTION OF THE DRAWINGS

The invention will become more readily apparent from the following description of the embodiments thereof which are shown, by way of example only, in the accompanying drawings, wherein.

DETAILED DESCRIPTION

The present invention can be incorporated into any system wherein a liquid is being pumped under pressure to a distribution network, or the like, and wherein, if the pumping pressure suddenly drops, the already pumped liquid would return toward the pump under pressure as a surging back-flow.

Figure 1:
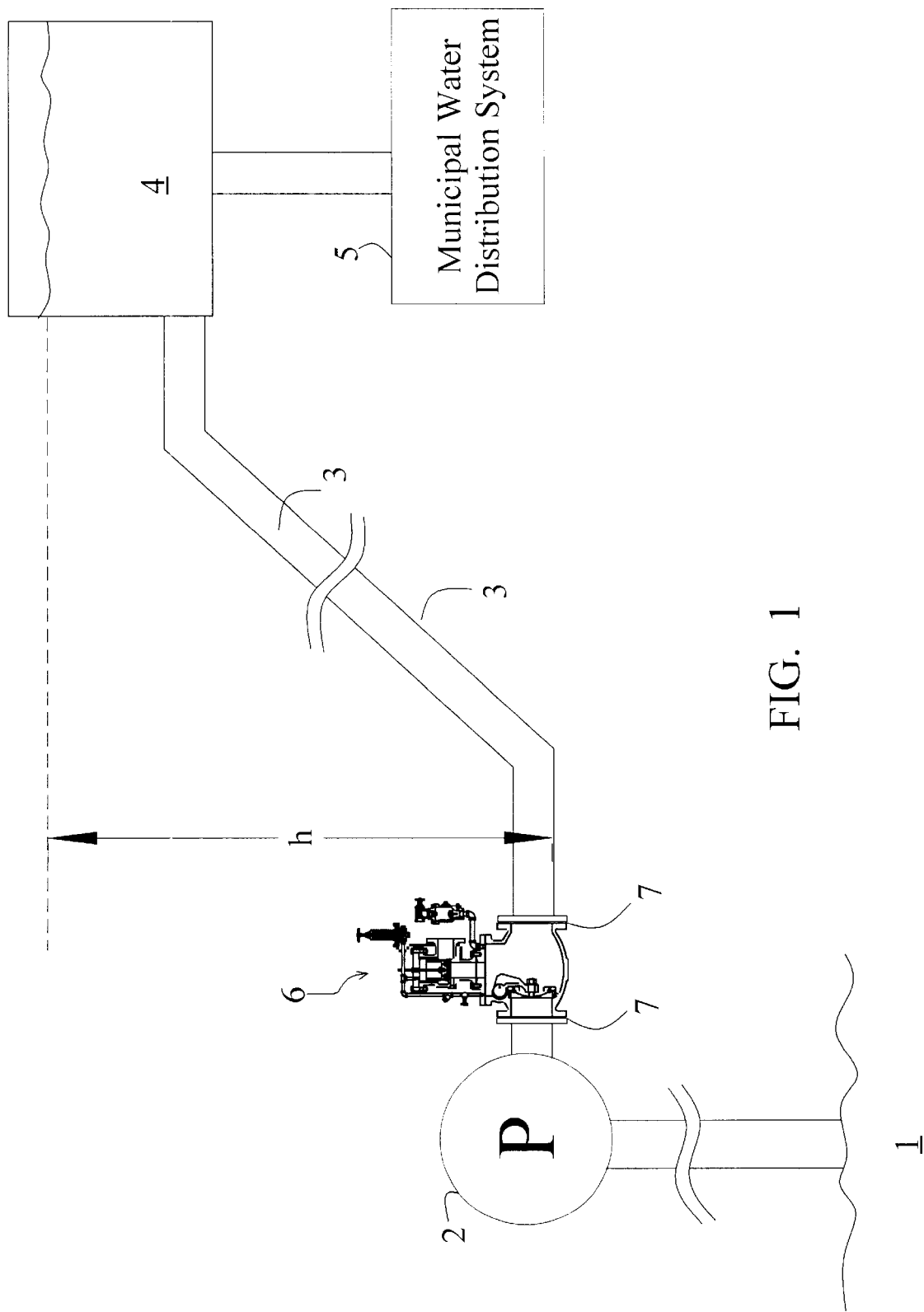
FIG. 1 is a schematic diagram of a fluid distribution system which incorporates the device of the present invention.

Liquid systems, which should incorporate the present device, for protection of components of the system, include municipal water systems, municipal sewage systems, oil or other liquid pipeline systems, and industrial processing systems. For purposes of disclosing the present invention, one type of a municipal water system will be described. FIG. 1 shows a municipal water system having a water source 1. Water is pumped by a water pump 2 through piping 3 to a water storage tank 4 for distribution to homes, commercial establishments, industrial facilities, and the like through distribution pipes of a municipal water distribution system 5. In such a distribution system, the pump 2 must provide an output pressure in excess of a back pressure resulting from gravity acting on the water of the system. The amount of back pressure is dependent on the height h from the pump to the top surface of the water in storage tank 4. It is that back pressure, which if unchecked, can cause severe damage to the pump and associated equipment of the pumping facility if a sudden drop in pumping pressure occurs. Such a sudden drop in pumping pressure can occur, for example, if electrical power to the pump is interrupted. The device of the invention, a safety check unit 6, is preferably installed in the water distribution system immediately downstream of the pump 2 as depicted in the schematic diagram of FIG. 1.

Figure 2:
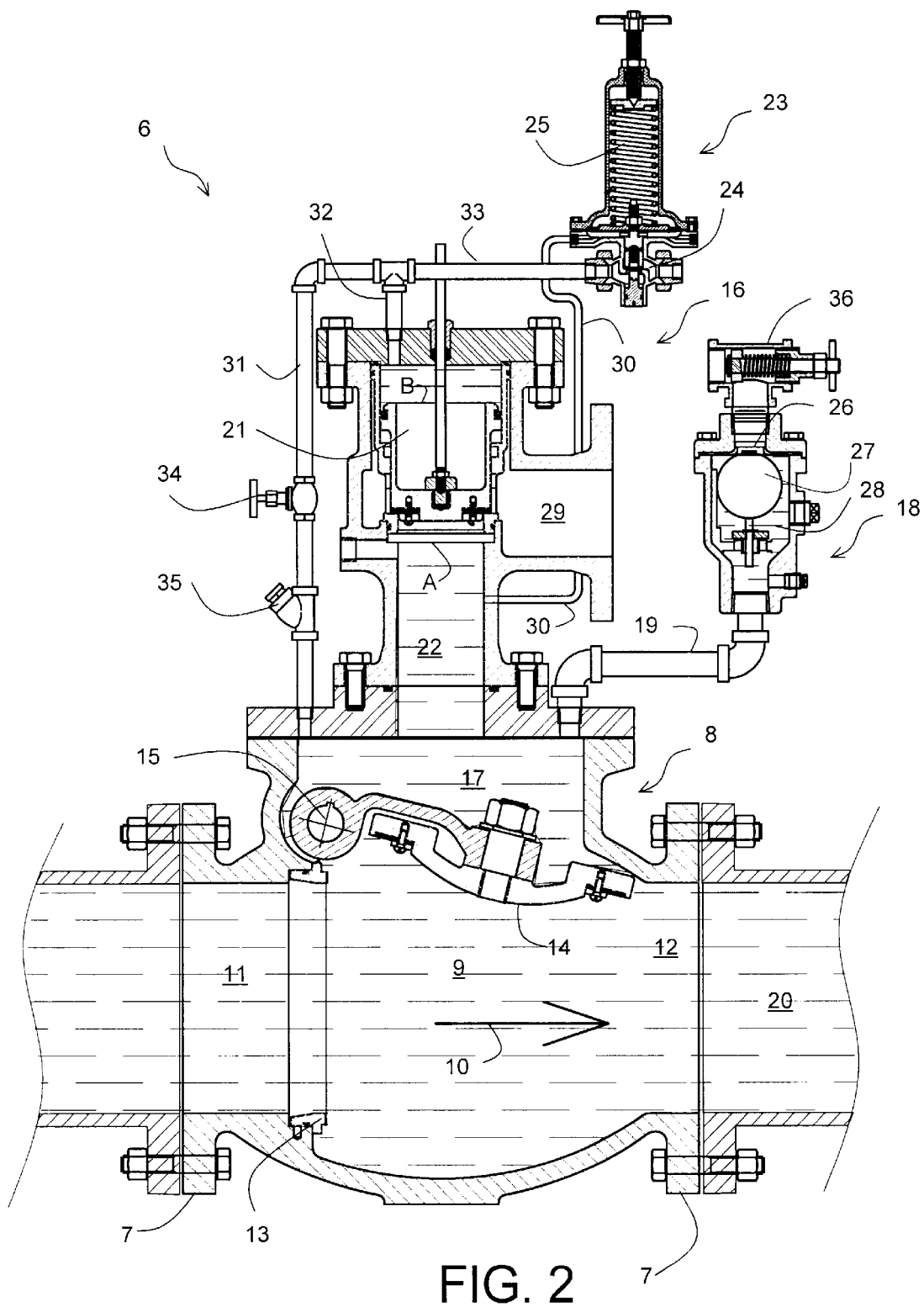
FIG. 2 is a vertical cross-section of the device of the present invention showing components positioned as they would be during normal pumping conditions.

FIG. 2 shows a vertical cross-section of the safety check unit 6 of the invention. The unit is installed so as to be in direct communication with the water being pumped and is preferably installed adjacent to the pump or a short distance from the pump in a header, manifold, or piping of the system, with use of flanges 7. A body 8 of the unit defines an internal chamber 9 through which the pumped water travels in a direction indicated by arrow 10 as it flows from inlet port 11 to outlet port 12. The body 8 has formed therein an annular seat 13 upon which closing member 14 pivotally closes to prevent back flowing of the water when the pumping pressure is less than the back pressure of the distribution system. FIG. 2 depicts the closing member 14 in an "open" position and FIGS. 3–7 depict the closing member 14 in a "closed" or "checking" position. In the preferred embodiment of the invention the manner of operation of the closing member is by a pivotal or swinging type movement about axis 15. Various other mechanisms for providing the checking action are possible. Other mechanisms providing checking action are piston action, poppet action, tilting disc action, spring loaded action, etc.

The device of the invention includes other portions, which are also in direct communication with chamber 9. Such direct communication with that chamber provides for optimum operation of the device and greatest protection for the equipment of the pumping system. The other portions of the device include a surge relief portion 16 which communicates with chamber 9 through, relief inlet port 17, and a combination air-vacuum portion 18 which communicates with chamber 9 through piping 19. In other embodiments of the invention the air-vacuum portion is made up of a separate air input portion and a separate air release portion.

A sequence of events, which most likely occurs when pumping pressure is suddenly lost, is described with reference to FIGS. 2–6. The functions carried out by safety check unit 6, in response to those events, are also described.

FIG. 2 shows safety check unit 6 in normal operation, that is, the pump is providing a liquid pressure at the outlet port 12 which is greater then the back pressure of the liquid distribution system. Therefore, liquid 20 is flowing in the direction indicated by arrow 10 from inlet port 11 to outlet port 12. The force of the flowing liquid overcomes the gravitational force on closing member 14 and closing member 14 is in the open position. In normal operation, surge relief portion 16 is blocking the escape of liquid by way of differential piston 21 blocking channel 22 which communicates with relief port 17. A pilot valve 23, which is used to control the surge relief portion 16 has opening 24 closed by the pressure of spring 25. Air/vacuum portion 18 has opening 26 closed by float assembly 27 which floats in chamber 28 in the liquid of the distribution system which fills that chamber. With safety check unit 6 having its components positioned as described, all of the pumped liquid entering inlet port 11 exits outlet port 12 for delivery to the liquid distribution system as no other outlet path is open.

Figure 3:
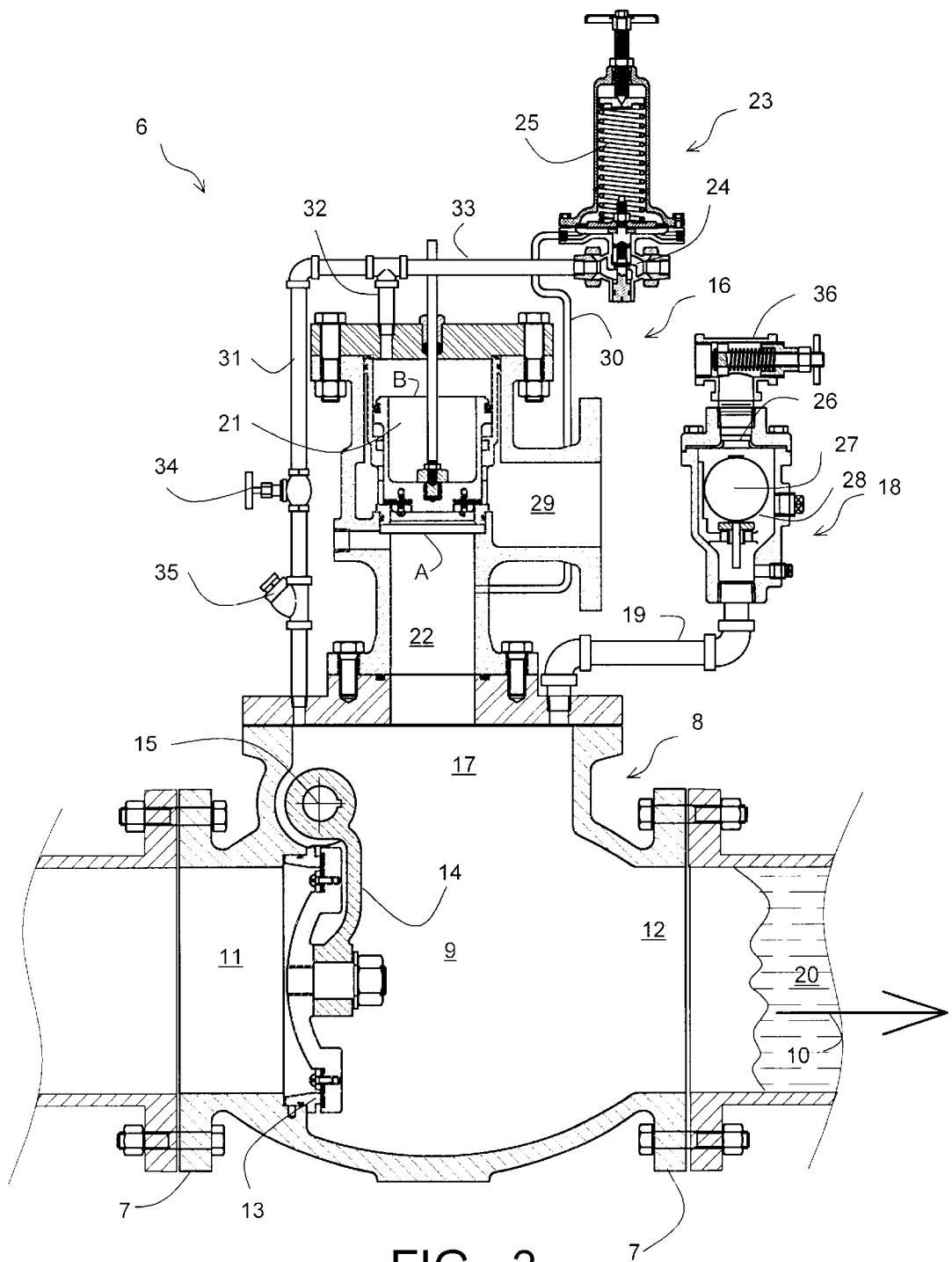
FIG. 3 is a vertical cross-section of the device of the present invention showing components positioned as they would be just following a sudden loss of pumping pressure and liquid flowing due to momentum of the liquid.

If a pump failure occurs, the following series of events most likely would take place in the distribution system. First in the sequence of events, the supply of liquid to inlet port 11 by the pump is terminated and the entrance of liquid or air past pump 2 and into the system through inlet port 11 is in most cases blocked by the mechanism of the pump. Without the flow of liquid, closing member 14 first drops by gravity to a position on annular seat 13 as depicted in FIG. 3.

Next, in the sequence of events, due to the momentum of the flowing (already pumped) liquid, a liquid column separation may occur whereby chamber 9 becomes at least partially empty of liquid and a near vacuum condition tends to occur in chamber 9. The near vacuum condition can extend partially into the pipe or manifold downstream of outlet 12 as shown in FIG. 3. Such a vacuum condition, which could have a damaging affect on the system, is averted by action of the air-vacuum portion 18 of the safety check unit. Opening 26 is opened by movement of float 27 downward in the now liquid-depleted chamber 28 by the force of gravity, so as to allow air into chamber 9 by way of piping 19. Air-vacuum portion 18 allows air into the chamber 9 when no liquid is present in chamber 28 containing float 27 and pressure in a void of chamber 9 is less than atmospheric pressure.

Figure 4:
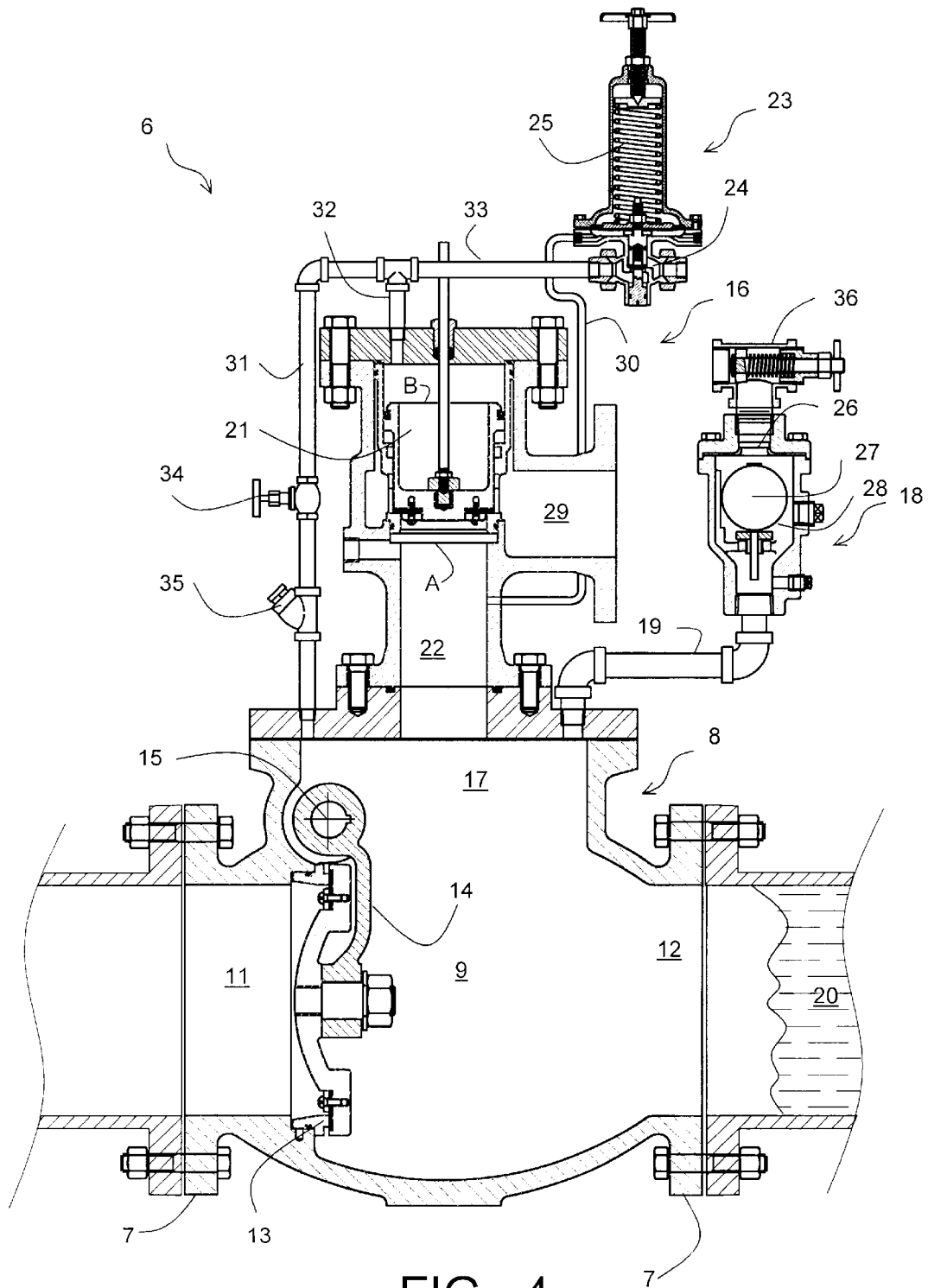
FIG. 4 is a vertical cross-section of the device of the present invention showing components positioned as they would be when liquid flow due to momentum has stopped.

Next, in the sequence of events, as the momentum of the flowing liquid diminishes, the flow of liquid stops as depicted in FIG. 4. Closing member 14 remains against annular seat 13, air vacuum portion 18 remains open due to float 27 being displaced from opening 26, and surge relief portion 16 remains closed.

Figure 5:
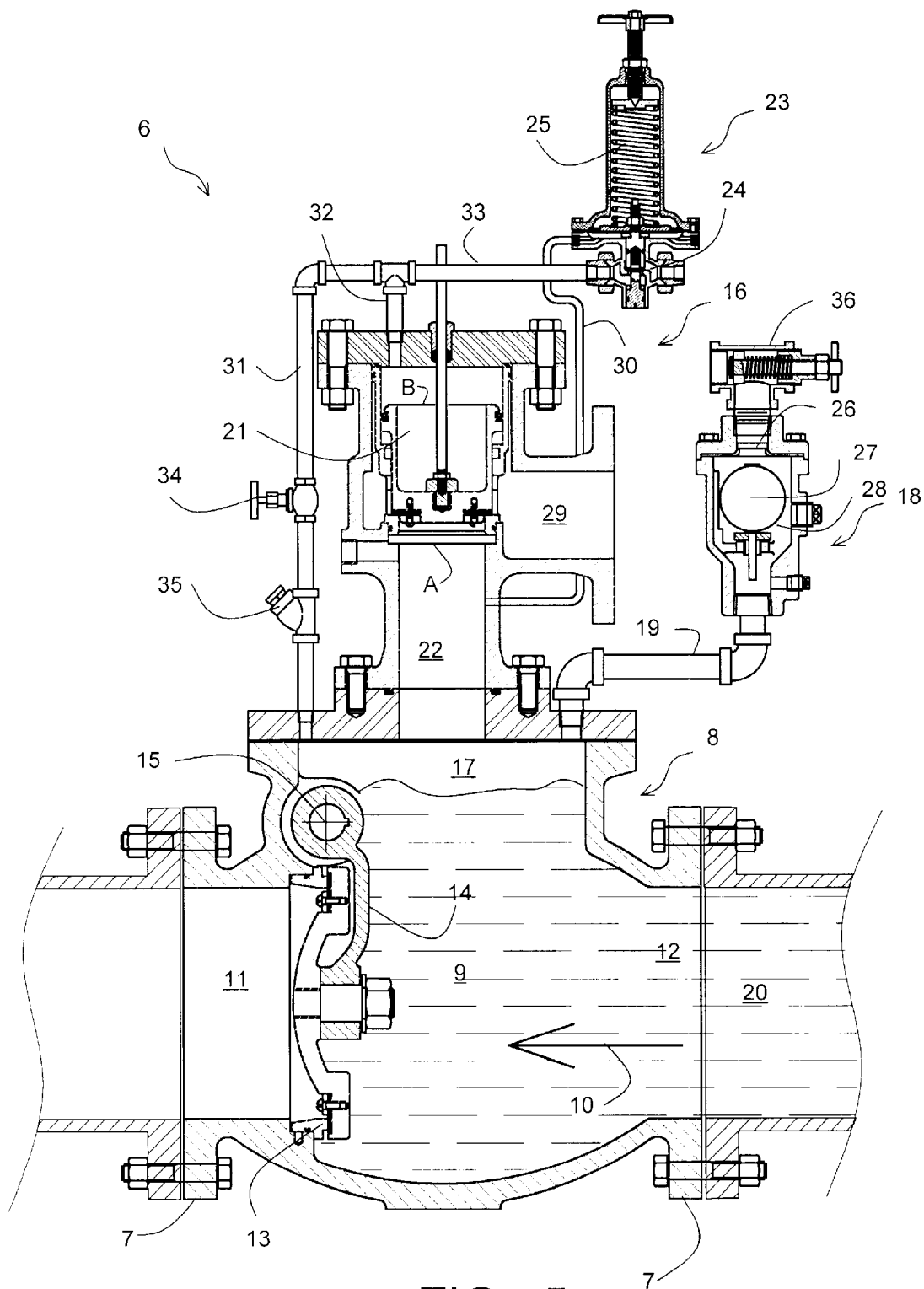
FIG. 5 is a vertical cross-section of the device of the present invention showing components positioned as they would be just following an initial stage of a surging backflow of liquid.

Next, in the sequence of events, the flow of liquid reverses and surges toward pump 2 as depicted in FIG. 5. Air in the system, which entered the system in order to prevent a vacuum condition, is now released from the system by way of the air/vacuum portion 18. Also, entrapped air from the liquid is released. Referring to FIG. 5, air-vacuum portion 18 has opening 26 in the open position since air is still present in chamber 28 and the float 27 is not floating. Air is released by the air/vacuum portion when the air is at a pressure greater than atmospheric pressure, as is the case when the liquid is back-flowing. The rate at which the air leaves the system can be restricted or regulated by throttling device 36 which is in communication with opening 26 of air/vacuum portion 18. In addition to the float action air/vacuum valve described above, spring type, and diaphragm type mechanisms can be incorporated. Additionally, a weight loaded type air input mechanism can be incorporated. By releasing the air at a selected rate, the air helps to cushion the surging back-flow of liquid.

Figure 6:
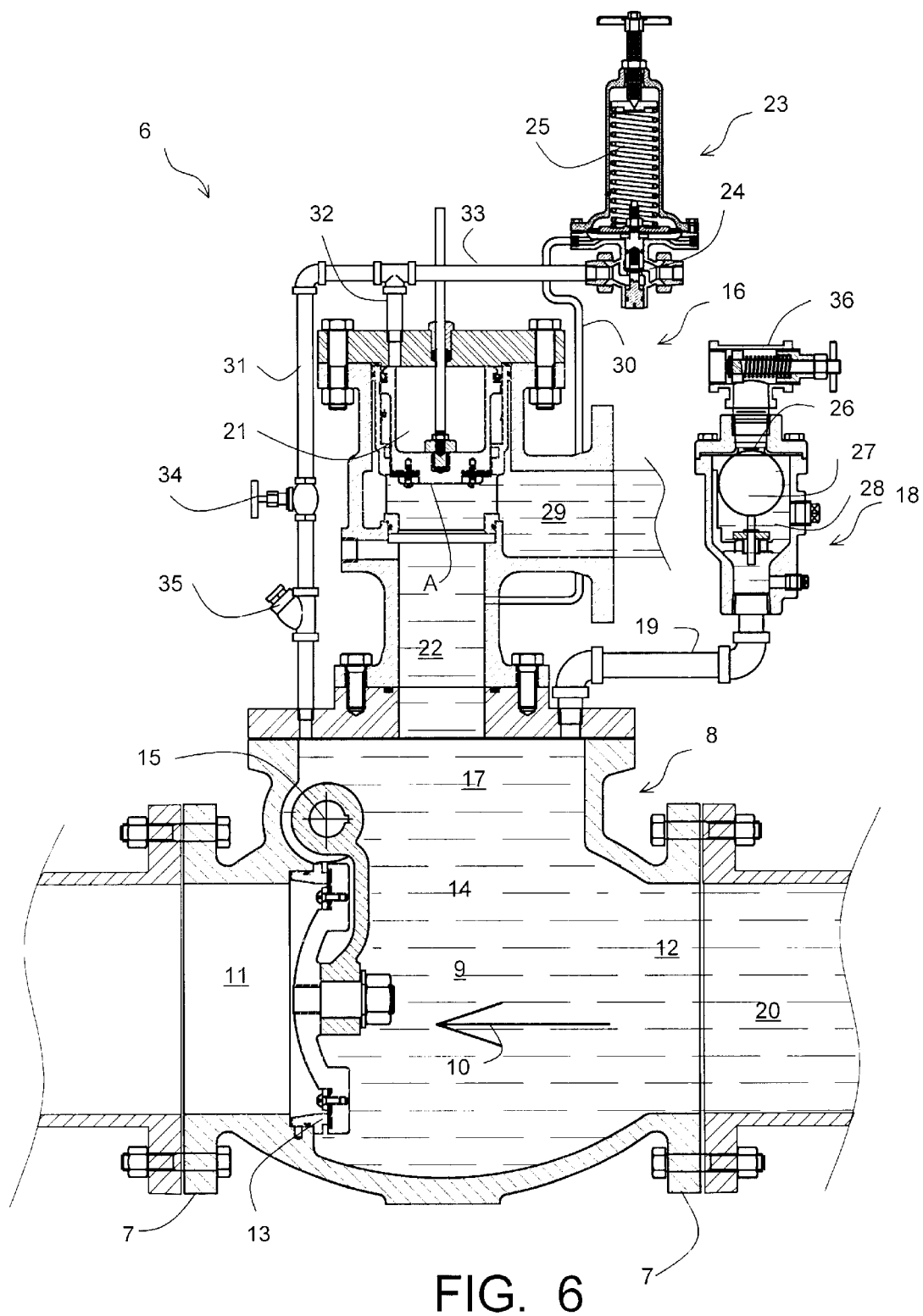
FIG. 6 is a vertical cross-section of the device of the present invention showing components positioned as they would be near the end of a surging back flow of liquid.

As described above, closing member 14 is closed against seat 13 initially by the force of gravity alone and then by the force of the back-flowing liquid. Following removal of air in the system, liquid enters chamber 28 and float 27 floats to close off opening 26. The pressure in chamber 9 increases, due to the surging back-flow of liquid. To relieve the pressure of the surging back-flowing liquid, differential piston 21 of surge pressure relief portion 16 displaces upwardly as shown in FIG. 6 to allow the surging liquid pressure to be relieved through outlet port 29. The pressure at which differential piston 21 displaces upwardly is pre-selected and is set at a value which is greater than the normal operating pressure of the pump. The differential piston 21 remains upwardly displaced until the pressure in chamber 9 is less than that set pressure. The pre-selected pressure is set by means of relief pilot valve 23. Relief pilot valve 23 senses the pressure in chamber 9 through sensing tube 30. During normal pumping operation of the distribution system (FIG. 2), differential piston 21 of the surge pressure relief portion 16 has liquid of equal pressure on faces A and B as face A communicates with chamber 9 by way of channel 22 and face B communicates with chamber 9 by way of piping 31 and 32. However, since face A has a smaller surface area than face B, the net force on the piston is downward, thus closing off channel 22. If the pressure in chamber 9, which is conveyed to relief pilot valve 23 through sensing tube 30 increases, due to the surging back-flow, to a pressure above the pre-selected pressure set for relief pilot valve 23, spring 25 is overcome by that pressure and valve opening 24 of the relief pilot valve 23 opens to the atmosphere so as to drop the pressure in piping 33 and 32 as well as the pressure against face B of differential piston 21. The pressure against face B is then such that the net force on differential piston 21 is in the upward direction thus allowing the surging pressure to be relieved by way of channel 22 and outlet port 29.

After the surging pressure is relieved and the pressure within chamber 9 becomes less than the pre-selected pressure, relief pilot valve 23 closes by action of spring 25, liquid pressure on faces A and B of differential piston 21 becomes substantially equal again, and, due to the difference in surface areas of the faces, the piston is forced to the downward closed position again. The speed at which the piston moves to the closed position can be controlled with use of closing speed control valve 34 which meters the liquid flowing toward face B of the differential piston. Speed control valve 34 is preferably a needle valve, but can be any of various other means of regulating flow so as to better control the flow of liquid so as to prevent a secondary surge of liquid which would result from differential piston 21 closing too quickly. In order to prevent clogging of needle valve 34, a strainer 35 is preferably disposed in piping 31 ahead of speed control valve 34.

Following the closing of outlet port 29 by differential piston 21, components of the safety check unit are disposed for normal pumping operation. When pumping is resumed, components of the safety check unit are disposed as depicted in FIG. 2, without intervention of operating personnel.

An important feature of the safety check unit of the invention is the common chamber with which all of the portions of the unit directly communicate. With such direct communication, each of the actions required by the different portions of the unit to protect the pump, and other components of the distribution system, takes place in a very short period of time so as to provide maximum protection to the pump and associated equipment.

Figure 7:
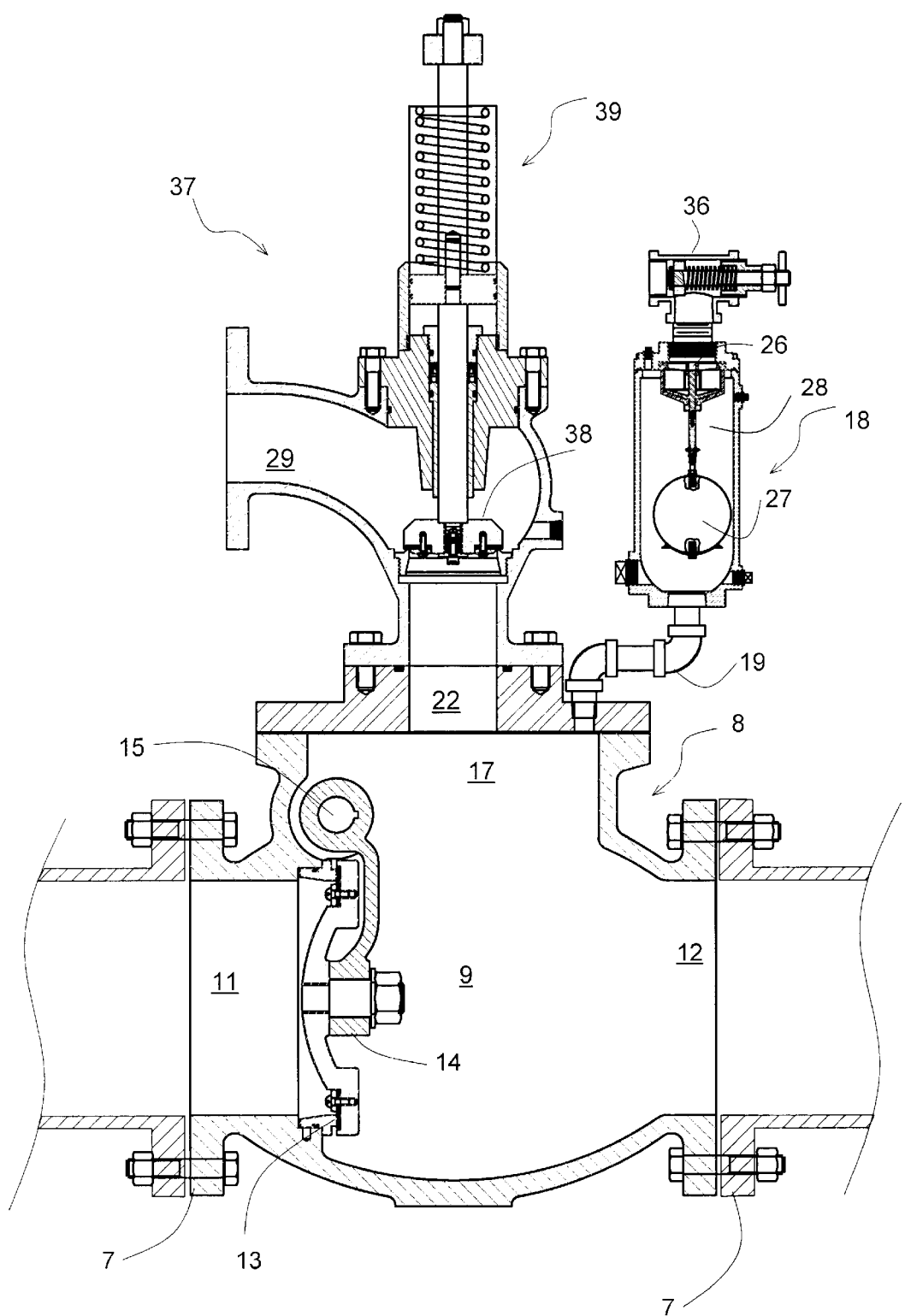
FIG. 7 is a vertical cross-section of the device of the present invention having an alternative surge pressure relief means.

A second embodiment of the invention provides surge pressure relief in a different manner. Referring to FIG. 7, surge pressure relief portion 37 relieves surging back-pressure of the liquid, as described above, by movement of valve 38 in an upward direction so as to open chamber 22. During normal operation of the system, valve 38 is held in a closed position by spring means 39. The pressure required for opening valve 38 is preselected and set by adjustment of the spring mechanism. In addition to the surge pressure relief valves described above, diaphragm operated, lever and weight, spring loaded and other type actions can be incorporated into the unit.

FIGS. 8–12 show the safety check unit of the invention having portions using various other mechanisms to carry out the functions of the device.

Figure 8:
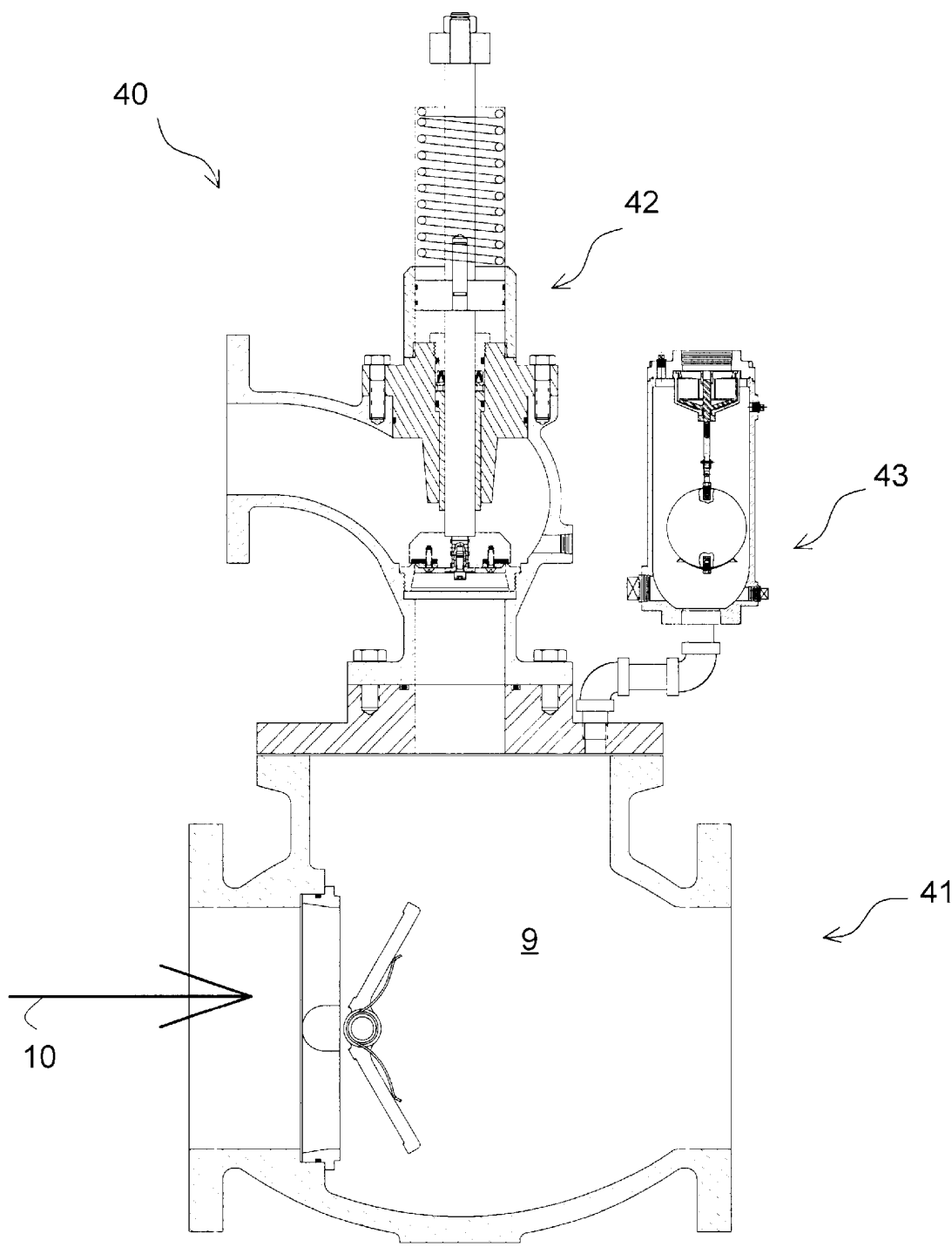
FIG. 8 is a vertical cross-section of the device of the present invention having an alternative liquid checking portion, surge pressure relief portion, and air input/release portion.

In FIG. 8, safety check unit 40 incorporates a spring loaded action liquid checking portion 41, a spring loaded action surge relief portion 42 and a float action air input/air release portion 43.

Figure 9:
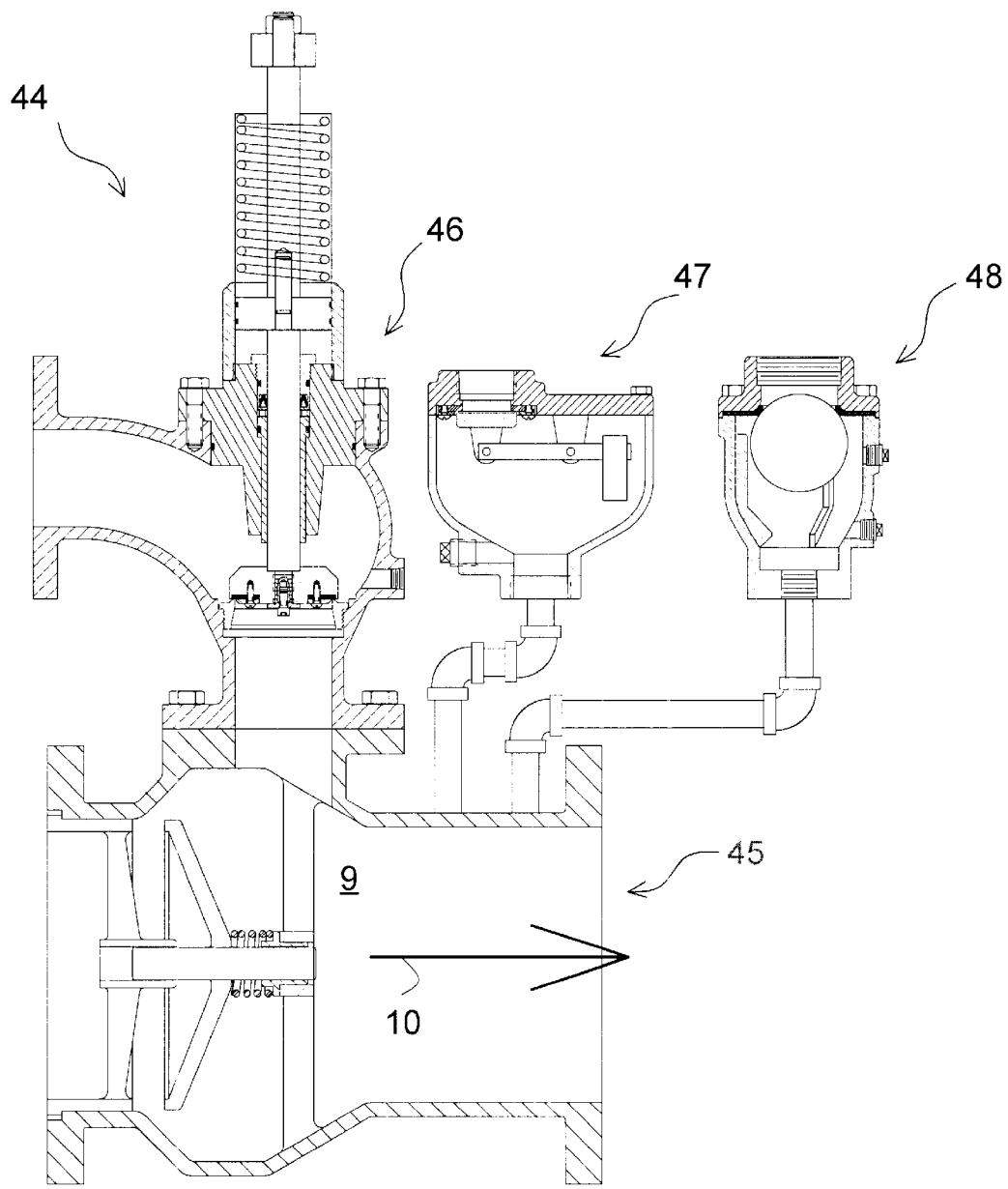
FIG. 9 is a vertical cross-section of the device of the present invention having an alternative liquid checking portion, surge pressure relief portion, air input portion, and air release portion.

In FIG. 9, safety check unit 44 incorporates a poppet action liquid checking portion 45, a spring loaded action surge relief portion 46, a weight loaded valve action air input portion 47, and a float action air release portion 48.

Figure 10:
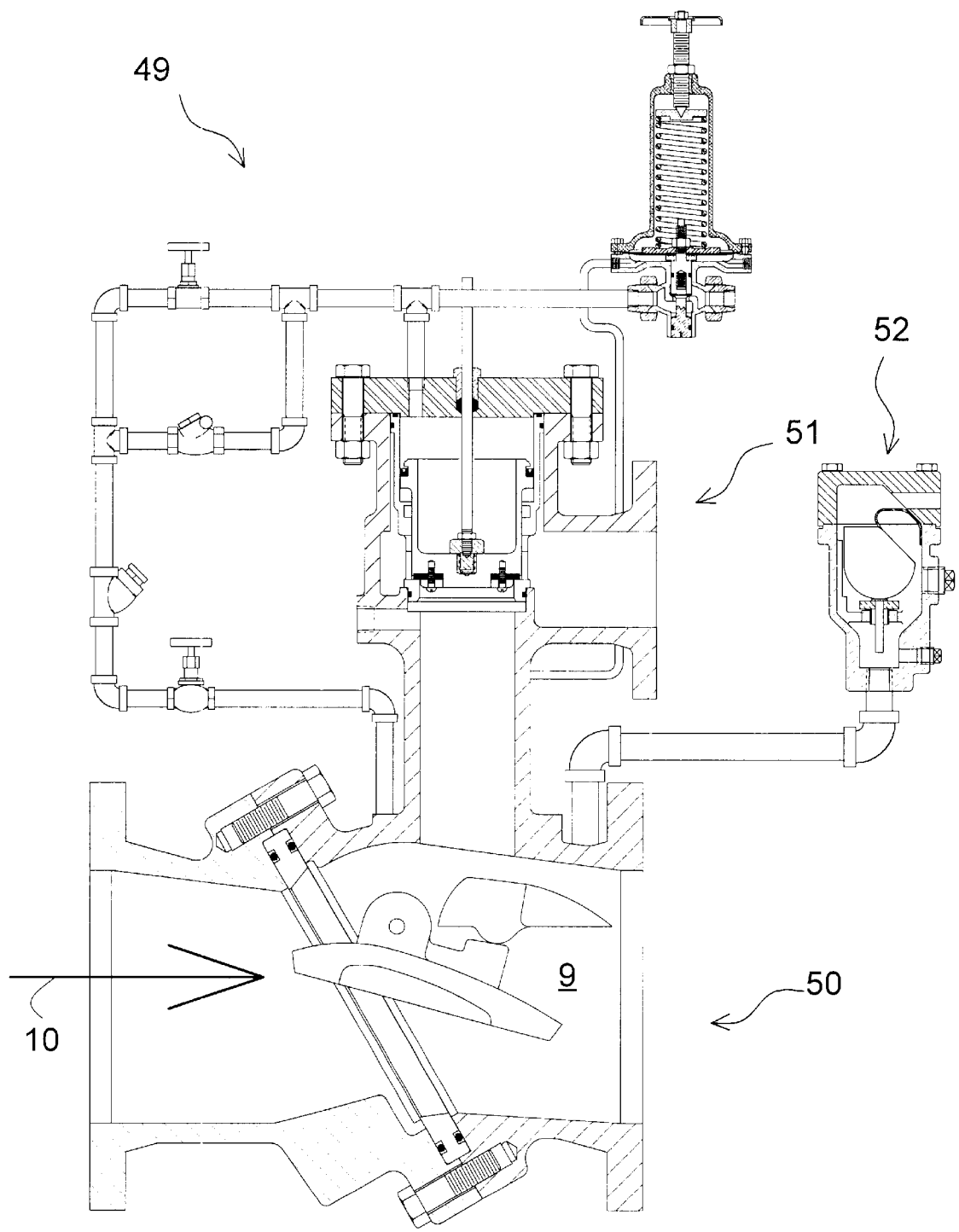
FIG. 10 is a vertical cross-section of the device of the present invention having an alternative liquid checking portion and air input/release portion.

In FIG. 10, safety check unit 49 incorporates a tilting disk action liquid checking portion 50, a piston action surge relief portion 51, and a diaphragm action air input/air release portion 52.

Figure 11:
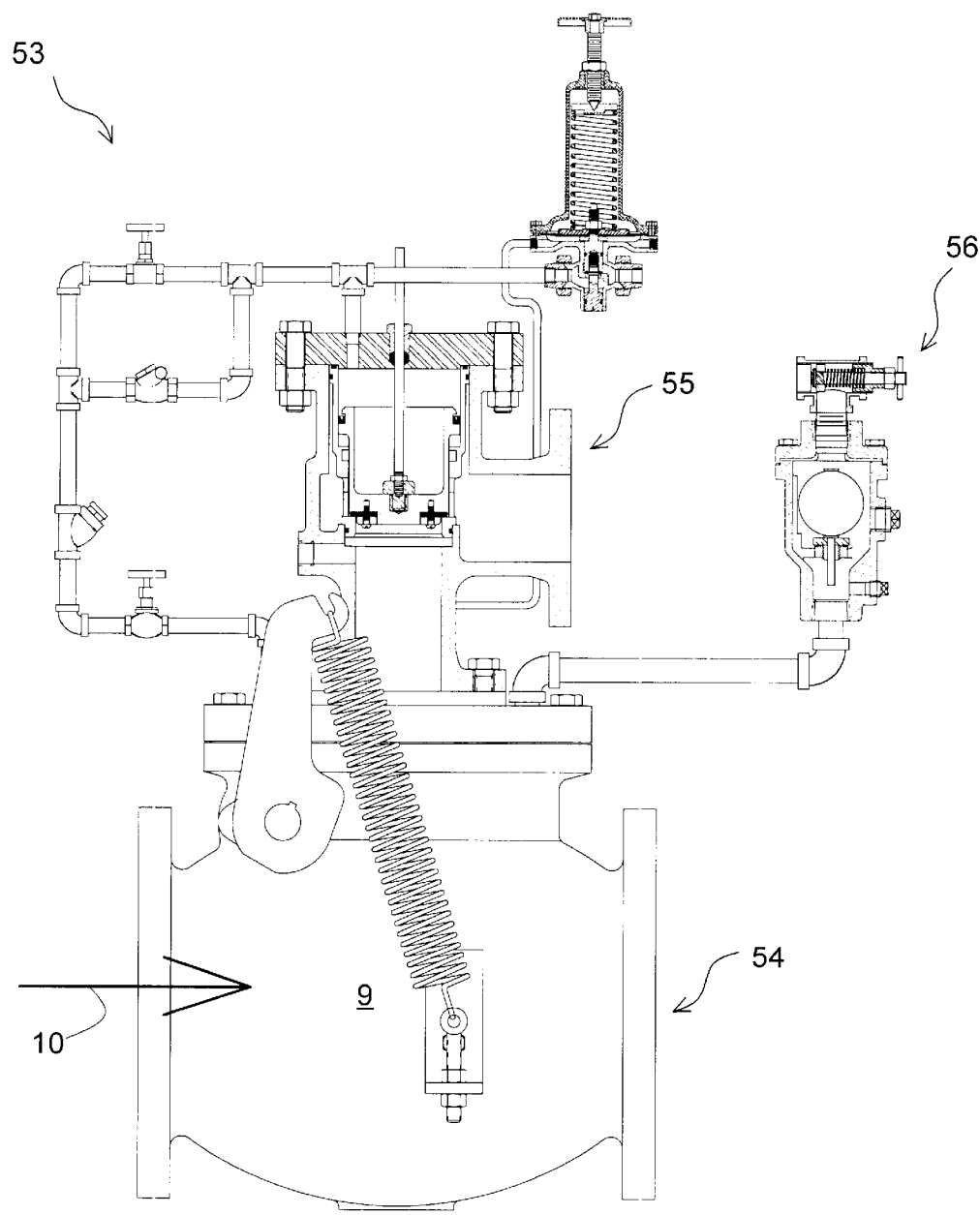
FIG. 11 is a partial vertical cross-section of the device of the present invention having an alternative liquid checking portion.

In FIG. 11, safety check unit 53 incorporates a spring loaded action liquid checking portion 54, a piston action surge relief portion 55 and a float action air input/air release portion 56.

Figure 12:
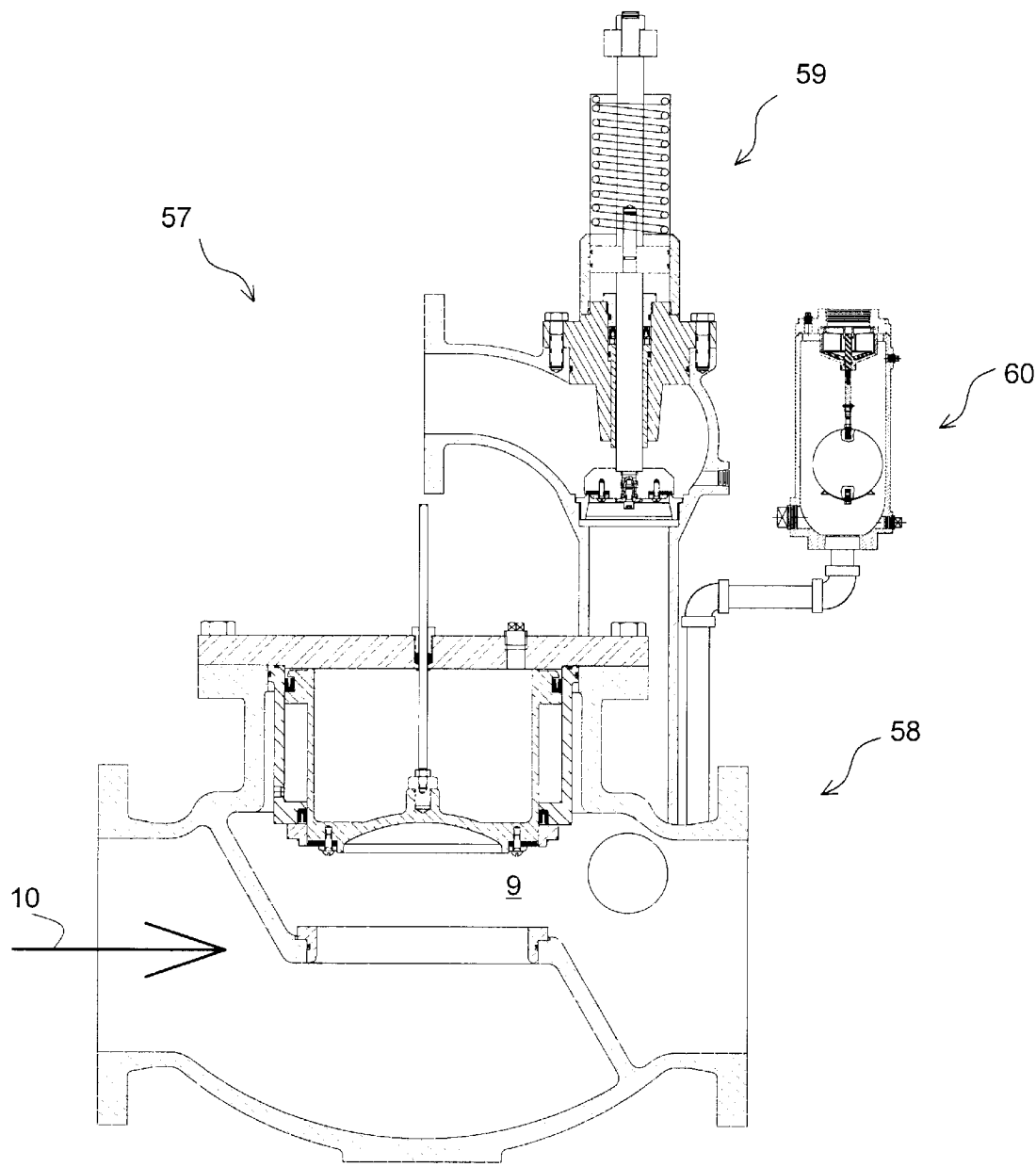
FIG. 12 is a vertical cross-section of the device of the present invention having an alternative liquid checking portion, surge pressure relief portion, and air input/release portion.

In FIG. 12, safety check unit 57 incorporates a piston action liquid checking portion 58, a spring loaded action surge relief portion 59, and a float action air input/air release portion 60.

In all of the above described safety check units the liquid checking portions of each includes an internal chamber 9 which communicates directly with the surge relief portion, the air input portion, and the air release portion.

While specific configurations of the components have been set forth for purposes of describing embodiments of the invention, various modifications can be resorted to, in light of the above teachings, without departing from applicant,s novel contributions; therefore in determining the scope of the present invention, references shall be made to the appended claims.

What is claimed:

1. A safety check unit for use in a liquid distribution system having a pump and piping downstream of the pump for distributing pumped liquid to the liquid distribution system, wherein the pump intakes a liquid at an intake pressure and outputs the liquid to the liquid distribution system at an output pressure which is greater than the intake pressure, and wherein absent action of the pump, liquid in the system exerts a back-pressure at the pump which is greater than the intake pressure, the safety check unit arranged for placement intermediate the liquid distribution system and the pump, and in liquid communication therewith, comprising a liquid checking portion, for checking liquid when back-flowing from the system toward the pump, having an inlet port in liquid communication with the pump, an outlet port in liquid communication with the distribution system, an internal chamber intermediate said ports, and a closing member disposed in said internal chamber for preventing back-flowing of the liquid;

a surge relief portion, communicating directly with said internal chamber, for relieving liquid and reducing liquid pressure in the liquid distribution system when the liquid pressure in said internal chamber is a preselected pressure which is greater than an operating output pressure of the pump;

an air input portion, communicating directly with said internal chamber, for providing air to the liquid distribution system when said internal chamber is at least partially void of liquid and a pressure in the void is below atmospheric pressure; and an air release portion, communicating directly with said internal chamber, for releasing air from the liquid distribution system when air is in said internal chamber at a pressure above atmospheric pressure.

2. The safety check unit of claim 1, wherein said closing member of said liquid checking portion operates by a mechanism having an action selected from a swing action, a spring loaded action, a piston action, a tilting disc action, and a poppet action.

3. The safety check unit of claim 1, wherein said surge relief portion operates by a mechanism having an action selected from a piston action, a diaphragm action and a spring loaded action.

4. The safety check unit of claim 1, wherein said air input portion operates by a mechanism having an action selected from a float action, a diaphragm action, and a weight loaded valve action.

5. The safety check unit of claim 1, wherein said air release portion operates by a mechanism having an action selected from a float action, and a diaphragm action.

6. The safety check unit of claim 1, wherein said air input portion and said air release portion are combined into a single mechanism in direct communication with said internal chamber.

7. The safety check unit of claim 1, wherein said surge relief portion includes means for controlling the rate of closing of said surge relief portion following relieving of the liquid so as to prevent secondary liquid surges in the distribution system.

8. The safety check unit of claim 1, wherein said air release portion includes means for controlling the rate of air being released from the distribution system so as to provide a cushion for the back flowing liquid.

* * * * *